(12) United States Patent
Floreskul et al.

(10) Patent No.: US 9,524,316 B2
(45) Date of Patent: Dec. 20, 2016

(54) PROCESSING SEARCH QUERIES USING A DATA STRUCTURE

(71) Applicant: Microsoft Technology Licensing, LLC, Redmond, WA (US)

(72) Inventors: Volodymyr Floreskul, Stockholm (SE); Konstantin Tretjakov, Tartu (EE); Marlon Gerardo Dumas, Tartu (EE); Ando Saabas, Tallinn (EE)

(73) Assignee: Microsoft Technology Licensing, LLC, Redmond, WA (US)

( * ) Notice: Subject to any disclaimer, the term of this patent is extended or adjusted under 35 U.S.C. 154(b) by 192 days.

(21) Appl. No.: 14/256,574

(22) Filed: Apr. 18, 2014

(65) Prior Publication Data
US 2015/0142796 A1 May 21, 2015

(30) Foreign Application Priority Data
Nov. 15, 2013 (GB) .................................. 1320225.4

(51) Int. Cl.
G06F 17/30 (2006.01)
G06F 17/10 (2006.01)
H04L 12/64 (2006.01)
G06Q 50/00 (2012.01)

(52) U.S. Cl.
CPC ......... *G06F 17/30386* (2013.01); *G06F 17/10* (2013.01); *G06F 17/30327* (2013.01); *G06F 17/30867* (2013.01); *G06F 17/30899* (2013.01); *G06F 17/30958* (2013.01); *G06Q 50/01* (2013.01); *H04L 12/6418* (2013.01)

(58) Field of Classification Search
CPC .................... G06F 17/30327; G06F 17/30958; G06F 17/30386; G06F 17/30899; G06F 17/10
USPC .................................. 707/736, 797, E17.012
See application file for complete search history.

(56) References Cited

U.S. PATENT DOCUMENTS

| 7,603,229 | B2 | 10/2009 | Goldberg et al. |
| 7,774,734 | B2 | 8/2010 | Goldberg et al. |
| 8,521,724 | B2 * | 8/2013 | Tretjakov .......... G06F 17/30979 707/716 |
| 8,527,503 | B2 | 9/2013 | Tretjakov et al. |
| 9,160,571 | B2 * | 10/2015 | Banerjee ............. H04L 12/6418 709/226 |

(Continued)

OTHER PUBLICATIONS

"Web Search Engine", Widipedia, the free encyclopedia, Mar. 19, 2015, 10 pages.

(Continued)

*Primary Examiner* — Phong Nguyen
(74) *Attorney, Agent, or Firm* — Monica Adjemian; Tom Wong; Micky Minhas

(57) ABSTRACT

The disclosure relates to of generating a data structure stored in a computer memory for use in performing a search query to determine a separation between nodes in a network of interconnected nodes, wherein the method comprises: selecting a set of landmark nodes from the network; and for at least two of the landmark nodes in the set; generating a path tree for each landmark node that indicates a separation between the landmark node and each of a plurality of nodes; wherein the generating is configured to limit the number of path trees each of said plurality of nodes may appear in to no more than a predetermined number of path trees. A method of processing a data structure is also disclosed.

20 Claims, 10 Drawing Sheets

(56) References Cited

U.S. PATENT DOCUMENTS

| | | | |
|---|---|---|---|
| 2005/0201278 A1* | 9/2005 | Banerjee | H04L 12/18 370/229 |
| 2005/0204042 A1* | 9/2005 | Banerjee | H04L 12/6418 709/226 |
| 2006/0047421 A1 | 3/2006 | Goldberg et al. | |
| 2012/0250535 A1 | 10/2012 | Delling et al. | |
| 2013/0103671 A1* | 4/2013 | Tretjakov | G06F 17/30445 707/716 |
| 2013/0103678 A1* | 4/2013 | Tretjakov | G06F 17/30424 707/723 |

OTHER PUBLICATIONS

"International Search Report and Written Opinion", Application No. PCT/US2014/065109, Mar. 27, 2015, 11 pages.

Akiba, et al., "Fast Exact Shortest-Path Distance Queries on Large Networks by Pruned Landmark Labeling", Proceedings: In Conference of ACM/SIGMOD, Jun. 22, 2013, 12 Pages.

Cowen, et al., "Compact roundtrip routing in directed networks", In Proceedings:Journal of Algorithms, vol. 50, Issue 1, Jan. 2004, 11 Pages.

Goldberg, et al., "Better Landmarks within Reach", In Proceedings of the 6th International Conference on Experimental Algorithms, Jun. 6, 2007, 14 Pages.

Goldberg, et al., "Computing Point-to-Point Shortest Paths from External Memory", In Proceedings of SIAM Workshop on Algorithms Engineering and Experimentation, Jan. 22, 2005, 27 Pages.

Goldberg, et al., "Computing the Shortest Path: A Search Meets Graph Theory", In Proceedings of the Sixteenth Annual ACM-SIAM Symposium on Discrete Algorithms, Jan. 23, 2005, pp. 156-165.

Gubichev, et al., "Fast and Accurate Estimation of Shortest Paths in Large Graphs", Proceedings: In the 19th ACM International Conference on Information and Knowledge Management, Oct. 26, 2010, 10 Pages.

Ikeda, et al., "A Fast Algorithm for Finding Better Routes by AI Search Techniques", Proceedings: In IEEE Vehicle Navigation and Information Systems, Aug. 31, 1994, pp. 291-296.

Kleinberg, et al., "Triangulation and Embedding using Small Sets of Beacons", Proceedings: In 45th Annual IEEE Symposium on Foundations of Computer Science, Oct. 17, 2004, 10 Pages.

Kwak, et al., "What is Twitter, a Social Network or a News Media?", In Proceedings of the 19th International Conference on World Wide Web, Apr. 26, 2010, 10 Pages.

Ley, et al., "Maintaining an Online Bibliographical Database: The Problem of Data Quality", Proceedings: in EGC, ser. Review of New Information Technologies, vol. RNTI-E-6, Jan. 17, 2006, 6 Pages.

Maue, et al., "Goal Directed Shortest Path Queries Using Precomputed Cluster Distances", Proceedings: In Journal of Experimental Algorithmics, Mar. 2009, 27 pages.

Mislove, et al., "Measurement and Analysis of Online Social Networks", in Proceedings of the 7th ACM SIGCOMM Conference on Internet Measurement, Oct. 24, 2007, 14 Pages.

Potamias, et al., "Fast Shortest Path Distance Estimation in Large Networks", In Proceedings of the 18th ACM Conference on Information and Knowledge Management, Nov. 2, 2009, pp. 867-876.

Sarma, et al., "A Sketch-Based Distance Oracle for Web-Scale Graphs", Proceedings: In the Third ACM International Conference on Web Search and Data Mining, Feb. 4, 2010, pp. 401-410.

Tretyakov, et al., "Fast Fully Dynamic Landmark-based Estimation of Shortest Path Distances in Very Large Graphs", In Proceedings of the 20th ACM International Conference on Information and Knowledge Management, Nov. 2, 2009, pp. 1785-1794.

Vieira, et al., "Efficient Search Ranking in Social Networks", In Proceedings of the Sixteenth ACM Conference on Conference on Information and Knowledge Management, Nov. 6, 2007, pp. 563-572.

Zhao, et al., "Efficient Shortest Paths on Massive Social Graphs", In Proceedings of the 7th International Conference on Collaborative Computing: Networking, Applications and Worksharing (CollaborateCom), Oct. 2011, 10 Pages.

Zhao, et al., "Orion: Shortest Path Estimation for Large Social Graphs", In Proceedings of the 3rd Conference on Online Social Networks, Jun. 22, 2010, 9 pages.

Zwick, "Exact and Approximate Distances in Graphs", In Proceeding of 9th Annual European Symposium on Algorithms, Aug. 28, 2001, pp. 33-48.

"Second Written Opinion", Application No. PCT/US2014/065109, Oct. 14, 2015, 7 pages.

"International Preliminary Report on Patentability", Application No. PCT/US2014/065109, Jan. 21, 2016, 8 pages.

* cited by examiner

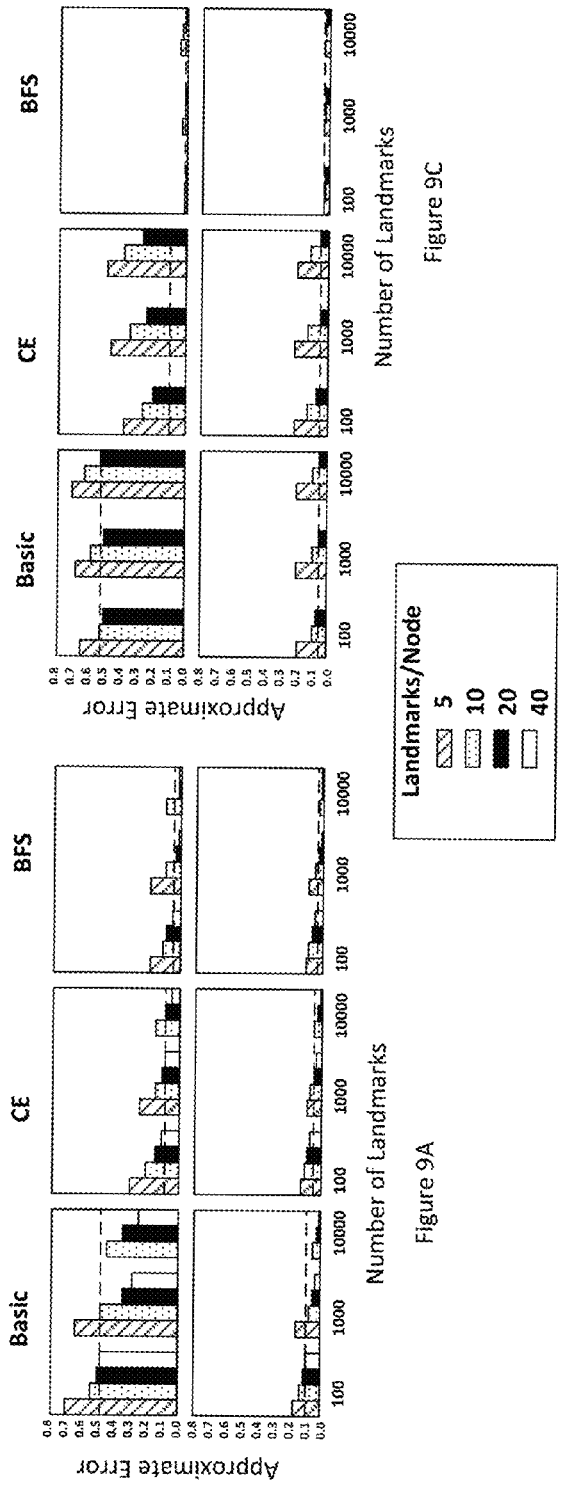
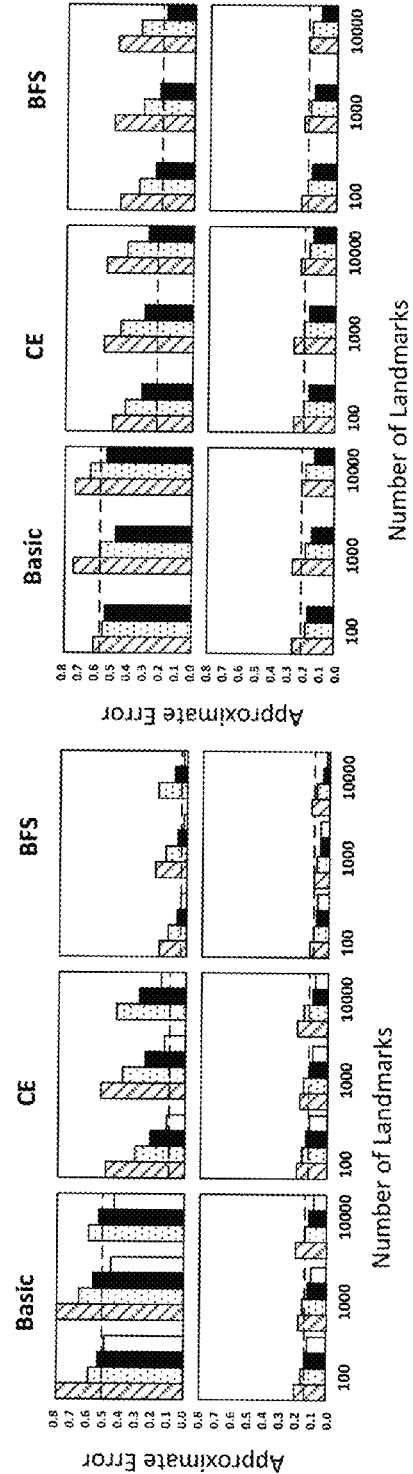
Figure 9A
Figure 9B
Figure 9C
Figure 9D

PROCESSING SEARCH QUERIES USING A DATA STRUCTURE

RELATED APPLICATIONS

This application claims priority under 35 USC §119 or §365 to Great Britain Patent Application No. 1320225.4 entitled "Processing Search Queries Using a Data Structure" filed Nov. 15, 2013 by Floreskul et al., the disclosure of which is incorporate in its entirety.

BACKGROUND

There exist many situations in which networks typically comprise a very large number of interconnected nodes.

For example, a computer network is a large network of interconnected routers, which act as interconnected nodes. FIG. 1 is a schematic diagram of a small part of a typical computer network. The network is shown to comprise a plurality of nodes ($N_i$) in the form of a plurality of routers arranged to route between a plurality of physical computer devices (as shown for example in the case of router Ni, which is shown to be associated with a mobile device 2, a PC 4 and a tablet 6). The routers are shown interconnected by connections Ci. In the context of the physical network, the connections Ci can be implemented in any known way, wired or wireless.

In another example, a communication network such as a social network comprises a large number of interconnected users. In this case, each node is a user, who can register or log into a particular network using a computer device. In the context of the nodes being users, the connections between users do not necessarily pertain to a single physical connection in a network, but represent a relationship between users associated with the nodes at either end of the connection. As an example, two users are considered to be connected if they are in each other's contact lists.

A task to be performed in such networks is to perform a search to find a separation between two nodes, i.e. a path or distance between the nodes. For example, in the case of a computer network, it may be desired to find the most efficient route across the network. As another example, when a user searches for the name of an acquaintance met via a friend, the acquaintance may be found as one of the search results having the shortest path length from the user. Similarly, a user may wish to know what chain of contacts allows him to reach another user in the network. Previous methods for finding the shortest paths between a given pair of nodes in a graph have used analytic techniques.

Existing analytic methods can be broadly classified into exact and approximate. Exact methods, such as those based on Dijkstra's traversal, are prohibitively slow for performing online queries on graphs with hundreds of millions of vertices (or "nodes"), which is a typical size for a contemporary social network. Among the approximate methods, a family of scalable algorithms for this problem are the so-called landmark-based (or sketch-based) approaches. In this family of techniques, a fixed set of landmark nodes (also referred to as sketches, pivots or beacons in various works) is selected and distances are precomputed from each vertex to some or all of the landmarks. Knowledge of the distances to the landmarks, together with the triangle inequality theorem for finding distances, typically allows approximate distance between any two vertices to be computed in $O(k)$ time (where k is the number of landmarks) and $O(kn)$ space (where n is the number of vertices in the network). Those estimates can then be used as-is, or exploited further as a component of a graph traversal or routing strategy in order to obtain an exact shortest path.

Landmark-based algorithms have been shown to perform well in practice, scaling up to graphs with millions or even billions of edges with acceptable accuracy and response times of under one second per query.

Various modifications of the basic landmark-based technique exist, for example, which allow the computation of the shortest paths themselves (rather than just distances), which support dynamic changes to the graph of interconnected nodes and/or which use landmark approximations as a guide to speed up the search for the exact shortest path. These modifications have been shown to provide good accuracy while keeping the query time in the order of milliseconds, even for very large graphs. The accuracy of landmark-based methods can be increased by using more landmarks. This, however, leads to linear increase in memory and disk space usage with only a slight reduction of the approximation error.

SUMMARY

The following provides a modification to landmark-based techniques which, all else being equal for a given application, may be suitable for obtaining a more desirable resource usage (e.g. memory usage) and/or query time for at least a comparable accuracy, or a more desirable accuracy for at least a comparable resource usage and/or query time.

According to one aspect described herein, there is provided method of generating a data structure stored in a computer memory for use in performing a search query to determine a separation between nodes in a network of interconnected nodes. The nodes may represent any physical or logical point. For example, the nodes may represent routers, users or vertices in a map in different network types. The separation may refers to a distance between nodes (represented using a suitable metric for the network type e.g. the number of hops between nodes or time taken to traverse a route). The separation may alternatively or in addition be an actual path, which includes a set of pointers for following the path. The method may comprise selecting a set of landmark nodes from the network; and for at least two of the landmark nodes in the set, generating a path tree for each landmark node that indicates a separation between the landmark node and each of a plurality of nodes. For example, the path trees may include pointers forming paths from each of the selected landmarks to each of a plurality of nodes. In another example, the path trees may include pointers forming paths from each of a plurality of nodes to each of the selected landmarks or to each of at least two landmark nodes. Landmarks may be selected using any suitable selection strategy. The generating may be configured to limit the number of path trees each of said nodes may appear in to no more than a predetermined number of path trees. In other words, the generation of path trees may be configured that a particular node may appear in no more than a predetermined number of path trees. A node appears in a path tree if it is included in the path tree. The predetermined number is set prior to generating the path trees.

According to another aspect disclosed herein, there is also provided a method of processing a search query to provide a search result. The method may comprise receiving at a computer device a search query in the form of a digital message, the query identifying a source node and a target node in a network of interconnected nodes, at least one of the interconnected nodes being a landmark node. The nodes may represent any physical or logical point. For example, the nodes may represent routers, users or vertices in a map in different network types. The separation may be an actual distance (represented using a suitable metric for the network type). The separation may alternatively or in addition be an actual path, which includes a set of pointers for following the path. The method may further comprise executing at the computer device an application for generating a search result. The application may perform operations of; accessing a data structure in which each landmark node has stored therewith a path tree that indicates a separation between the landmark node and each of a plurality of nodes, the number of path trees a particular node may appear in being limited to no more than a predetermined number of path trees; identifying landmarks having at least one of the source node and the target node in their path tree; and determining a search result related to the path tree of at least one of those landmarks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages or provide any of the particular advantages noted in herein.

BRIEF DESCRIPTION OF THE DRAWINGS

FIGS. 9A to 9D illustrate approximation error for various networks.

DETAILED DESCRIPTION

Figure 1:
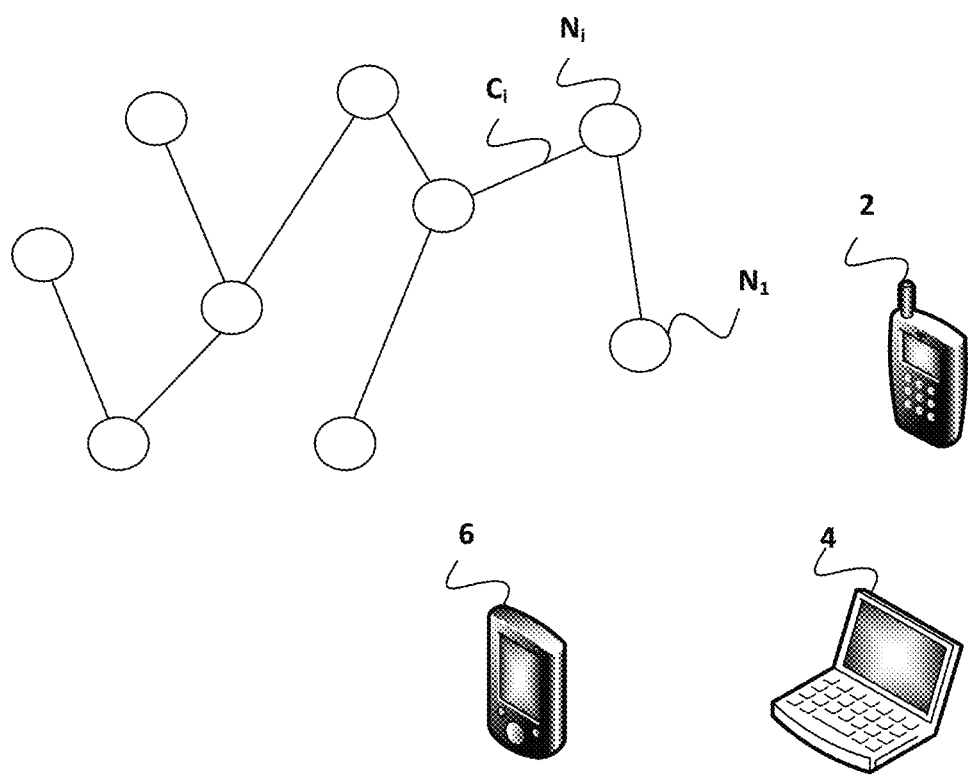
FIG. 1 is a diagram of part of a network.
Figure 2:
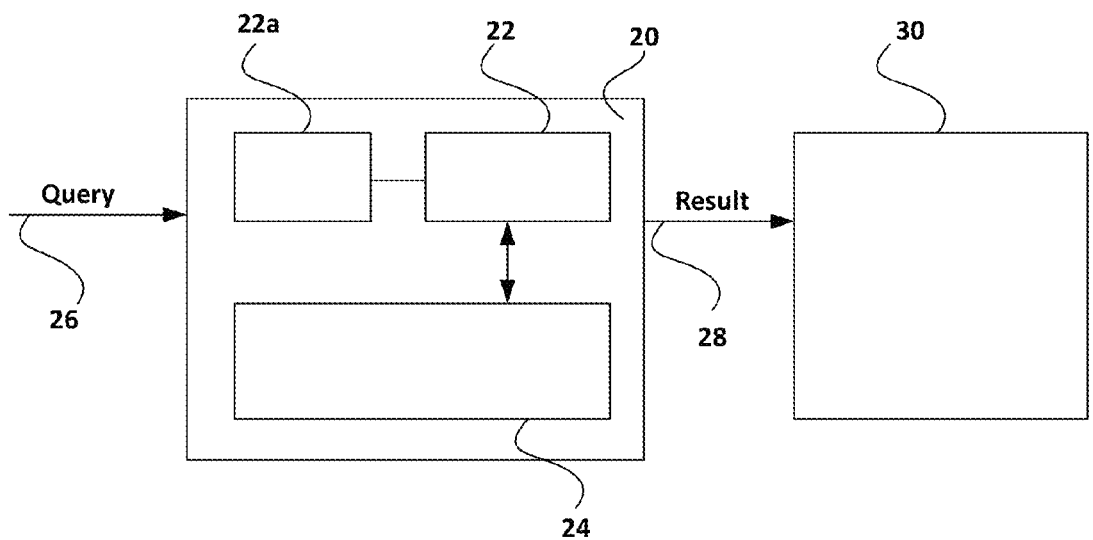
FIG. 2 is a block diagram of a system for performing a search.

FIG. 2 is a schematic block diagram of a system for processing a search query. The system comprises a computer device 20 which implements two components. A first component 22 is a data structure which is a memory or other form of computer store holding data in the form of a graph as described further herein. The second component is a processing function 24 which accesses the data structure 22 and uses it to process a search query. In operation, a query 26 in the form of a digital message is received by the computer device 20 and the computer device 20 operates to generate a result 28. The result can be utilised in a number of different ways by a user result function 30. For example the user result function 30 can be a search function which receives other inputs along with the result 28 and generates a search result to a user. Alternatively, the user result function 30 can be a display which displays a result 28 directly to a user.

Each component 22, 24 can be implemented by a processor and a memory. It will readily be appreciated that a single processor and single memory can be used to provide both components, or the components can be provided by separate processes and separate memories. In the first component, code executed by a processor 22a generates and maintains the data structure 22, and in the second component code executed by the processor processes the search query as will be described more fully later. Each of the components 22, 24 may be implemented at a server in a network.

The query 26 is received by the computer device 20 from a user. A user can input the query into one of the physical devices with which he is associated by any known input means. The query is supplied to the computer device 20 in the form of a digital message over any transmission mechanism. For example, where the user is associated with a client terminal, the query can be supplied through the internet to a server at which the computer device 20 is implemented. Alternatively, the query could be handled locally at a client terminal. As will become clearer in the following, the query includes an identifier of a source node, generally being a node associated with the user inputting the query, and a target node which will be the subject of the search.

The search query may relate to any network of interconnected nodes. For example, the search query could be used to find a path and/or distance between two routers in a computer network. The search query could be used to find a smallest number of social connections between users in a communication network. The search query could be used to find the shortest distance between two physical locations (e.g. from a map). The presently described techniques are not limited to any one of these forms of search queries or network types and may apply to any system (logical or physical) of interconnected nodes for which a separation between two nodes is sought.

Before describing various embodiments, landmark-based distance estimation techniques will first be described.

A path $\pi_{s,t}$ of length l between two vertices s,t∈V is defined as a sequence $$\pi_{s,t}=(s,u_1,u_2,\ldots,u_{l-1},t)$$

where $\{u_1, u_2, \ldots, u_{l-1}\} \subseteq V$ and $\{(s,u_1), (u_1,u_2), \ldots, (u_{l-1},t)\} \subseteq E$ The length l of a path $\pi_{s,t}$ is denoted as $|\pi_{s,t}|$.
The concatenation of two paths:

$$\pi_{s,t}(s,\ldots,t)$$

And;

$$\pi_{t,v}=(t,\ldots,v)$$

is the combined path $$\pi_{s,v}=\pi_{s,t}+\pi_{t,v}=(s,\ldots,t,\ldots,v)$$

The distance d(s,t) between the source and target nodes s,t is defined as the length of the shortest path between s and t. The shortest path distance d(s,t) in a graph is a metric and satisfies the triangle inequality: for any s,t,u∈V $$d(s,t) \leq d(s,u)+d(u,t).$$

The upper bound of the shortest path distance d(s,t) becomes an equality if there exists a shortest path $p_{s,t}$ that passes through u.

The diameter of a graph is the maximal length of a shortest path in the graph. The diameter of social networks is small. In this context, small is used relative to the size of the network. The diameter correlates to the maximum time for responding to a user query and so reductions in the diameter correspond to reductions in the maximum time Centrality of a vertex is a general term used to refer to a number of metrics of importance of a vertex within a graph. Betweenness centrality corresponds to the mean proportion of shortest paths passing through a given vertex. Closeness centrality measures the average distance of a vertex to all other vertices in the graph.

If the node u lies on or near an actual shortest path from s to t, the upper bound of the shortest distance is usually a good approximation of the true distance d(s,t). This forms the core idea of all landmarked-based approximation algorithms.

Known Landmarks-Basic, the Landmarks-Lowest-Common-Ancestor (Landmarks-LCA) and the Landmarks-Breadth-First-Search (Landmarks-BFS) distance estimation techniques are now explained.

The same precomputation algorithm is applied for each of Landmarks-Basic, Landmarks-LCA and Landmarks-BFS. In this algorithm, distances from each landmark to each node are precomputed. A known example of such an algorithm is provided as Algorithm 1.

---

Algorithm 1 Precomputation for LANDMARKS-BASIC, LANDMARKS-LCA and LANDMARKS-BFS, from [11??]

Require: Graph G = (V, E), number of landmarks k.
1:   procedure PRECOMPUTE(k)
2:      U ← SELECT-LANDMARKS(G,k)
3:      for u ∈ U do
4:         Do a BFS traversal starting from u.
5:         for each v ∈ V during traversal do:
6:            $d_u[v]$ ← distance from v to u
7:            $p_u[v]$ ← next node after v along the
8:               shortest path from v to u
9:         end for
10:     end for
11:  end procedure

---

In Landmarks-Basic, a landmark node u is fixed and the distance d(u,v) from this node to every other vertex v (or node) in the graph is precomputed. An upper bound approximation for the distance d(s,t) between any two source and target nodes s,t is obtained using:

$$d^{u}_{approx}(s,t) = d(s,u) + d(u,t)$$

Selecting a set $U = \{u_1, u_2, \ldots u_k\}$ of k landmarks, an improved approximation of $d^{U}_{approx}(s, t)$ can be computed:

$$d^{U}_{approx}(s,t) = \min_{u \in U} d^{u}_{approx}(s,t)$$

In principle, the triangle inequality also allows the computation of a lower bound on the distance. Lower bound distances may also be used to compute the distance.

In the following, the above described algorithm is referred to as LANDMARKS-BASIC. A known Landmarks-Basic algorithm is provided below as Algorithm 2.

---

Algorithm 2 LANDMARKS-BASIC, from [11??]

Require: Graph G = (V, E) a landmark u ∈ V, a
   distance value $d_u[v]$ precomputed for each v ∈ V.
1:   function LANDMARKS-BASIC$_u$(s, t)
2:      return $d_u[s] + d_u[t]$
3:   end function

---

For unweighted graphs, the Landmarks-Basic algorithm uses O(km) time to precompute distances using k Breadth-First-Search (BFS—described below) traversals and O(kn) space to store the distances. Each query is answered in O(k) time. The Landmarks-Basic algorithm approach only allows the computation of an approximate distance, but does not provide a way to retrieve the path itself.

The Landmarks-LCA algorithm provides a way of retrieving the path itself by also precomputing a whole shortest path tree (SPT) for the landmark node u. This makes it possible to later restore the actual shortest paths $\pi_{s,u}$ and $\pi_{u,t}$ for any source and target node s,t. The final approximation is computed by merging the two paths using concatenation and removing any cycle that occurs in the resulting path. Removing cycles is discussed later. Besides performing basic landmark-based approximation, the availability of the SPT allows the upper bound estimates on distances for many vertex pairs to be improved. A known Landmarks-LCA algorithm is provided as Algorithm 3 below.

---

Algorithm 3 LANDMARKS-LCA, from [11??]

Require: Graph G = (V, E), a landmark u ∈ V, a
   parent link $p_u[v]$ precomputed for each v ∈ V.
1:   function LANDMARKS-LCA$_u$(s,t)
2:      $\pi^{(1)}$ ← PATH-TO$_u$(s, (u) )
3:      $\pi^{(2)}$ ← PATH-TO$_u$(t, $\pi^{(1)}$ )
4:      LCA ← Last element of $\pi^{(2)}$
5:      $\pi^{(3)}$ ← PATH-TO$_u$(s, (LCA) )
6:      return $|\pi^{(2)}| + |\pi^{(3)}|$
7:   end function
8:   function PATH-TO$_u$(s,π)
        Returns the path in the SPT $p_u$ from the vertex s
        to the closest vertex q belonging to the path π
9:      Result ← (s)       ▷ Sequence of 1 element.
10:     while s ∉ π do
11:        s ← $p_u[s]$
12:        Append s to Result
13:     end while
14:     return Result▷ (s, $p_u[s], p_u[p_u[s]], \ldots$, q), q ∈ π
15:  end function

---

Both Landmarks-Basic and Landmarks-LCA are typically used with a set of k different landmarks: the method is applied for each landmark separately and the most suitable result is returned.

Finally, the Landmarks-BFS algorithm is described. In this algorithm, the shortest path trees are precomputed (like the Landmark-LCA algorithm). However, the approximation is computed by collecting all of the nodes lying on all the shortest paths from the source s to the target t to all the landmarks, and then running a standard breath-first (or Dijkstra) search on the resulting subgraph. This identifies any connections (aka "edges") between vertices that are not in any of the shortest path trees of the landmark nodes. These identified connections may be used to calculate an efficient path accurately. A known Landmarks-BFS algorithm is provided as Algorithm 4 below.

---

Algorithm 4 LANDMARKS-BFS

Require: Graph G = (V, E), a set of landmarks U ⊂
   V, a parent link $p_u[v]$ precomputed for each u ∈
   U, v ∈ V.
1:   function LANDMARKS-BFS(s,t)
2:      S ← ∅
3:      for u ∈ U do
4:         S ← S ∪ PATH-TO$_u$(s, (u))
5:         S ← S ∪ PATH-TO$_u$(t, (u))
6:      end for
7:      Let G[S] be the subgraph of G induced by S.
8:      Apply BFS on G[S] to find a path π
9:         from s to t,
10:     return |π|
11:  end function

---

Traditional landmark-based methods use the computation of a shortest-path tree (SPT) for each landmark node u. An SPT may be stored by keeping a parent pointer $p_u[v]$ for each node of the set of vertices V, which indicates the node that follows the node v on the shortest path from v to u. SPTs may be stored in other forms, as known by a person of ordinary skill in the art. For example, instead of storing a pointer from a child node to a parent node in the tree, it is possible to store a pointer from a parent node to a child node in the tree. For the Landmarks-Basic method, only the distance $d_u[v]$ from node v to the landmark u needs to be kept. In both cases, however, the space needed for storing the precomputed data for each landmark is proportional to the number of nodes n in the graph. For k landmarks this results in a total memory needed of O(kn).

The complexity of the traditional landmark-based methods can be reduced by pruning the size of the shortest path trees that needs to be stored. Formally, a pruned landmark tree (PLT) for a landmark node is a shortest path tree on a subset of nodes from the set of nodes/vertices V having the landmark node as the root.

Various strategies for pruning the landmark trees are known. For example, in one known strategy, trees are limited based on depth. This means that when the tree is being built, all nodes that are further away from the landmark larger than some fixed value are left out of the tree. This results in nodes being unequally covered by landmarks and may even result in some nodes being unconnected to any landmarks at all.

In the following, strategies for pruning the size of the shortest path tree are described. In particular, a precomputation is performed in which a limitation is applied to nodes instead of to only landmarks. The precomputation is applied to a graph consisting of a plurality of vertices and connections between various vertices. A vertex is a node that in an interconnected network (as described above). A vertex may represent at least one of a physical location, a person/user and a router. A connection between two vertices represents a physical and/or an abstract link between the two vertices (as described above). For example, the connection (or "edge") may represent a road where the graph represents a map. The connection may represent a link between people, such as colleagues where the graph represents social links between people. The connection may represent a wired or wireless link between routers in a network.

The vertices comprise both landmark nodes (called "landmarks" in the following) and non-landmark nodes. The landmarks are selected from the vertices using a suitable selection scheme known to a person of ordinary skill in the art. For each landmark, a path tree is generated that links different chains of nodes together (for example, using a pointer). In the following, the generation of a path tree is configured to limit the number of path trees in which a node can appear in to no more than a fixed number r. More formally, for every node in the set of vertices V, the size of a landmark set L(v) associated with a node is limited to a fixed number r. The fixed number r is set prior to precomputation of the path trees. Landmarks that are frequently close to a node tend to provide good approximations. Consequently, it is useful to prune the trees so that each node v is only present in the shortest path trees (SPTs) of its r closest landmarks. This can be achieved using a modified Breadth-First-Search (BFS) algorithm (called PLT-Precompute) in the following. PLT-Precompute is an algorithm that is applied to provide the data structure for later processing search queries between two nodes.

Once generated, the path trees are stored in a suitable storage medium. In embodiments, the storage medium may also store, for each landmark node, an indication of a separation to at least one other landmark node. An indication of a separation between each landmark node and every other landmark node may be stored. The storage medium may also store details of a witness node (described later herein). A witness node may be selected for determining an approximate separation between at least two landmark nodes. A separation between the witness node and each of at least two landmarks is determined and may be stored in the storage medium. If the separation between the witness node and each of the at least two landmarks is not stored, this can be re-computed during the execution of a search query. The storage medium may also comprise information relating to connections between nodes that are present in the interconnected network (or graph) but that are not present in any of the generated path trees. This information may be utilised if a breadth-first-search is later executed on the data structure. The storage medium may form part of a distributed memory architecture or form part of a single device.

Limiting the number of path trees that each of the nodes may appear in may comprise limiting each of the nodes to appear in the path trees of only the closest landmark nodes to a respective node. When a path tree is a shortest path tree, it may be provided and/or stored in the form of links, such as parent or child links. Each link may identify an adjacent node in the network.

The separation indication may comprise only distances between landmarks and nodes in the path trees. The separation indication may comprise both distances and paths between landmarks and nodes in the path trees.

A specific example of a PLT precompute algorithm is given.

PLT-precompute is similar to the regular BFS in that it is based on an iteration over a queue. This queue contains tuples (u; v; d), where u is a landmark, v is the next node to be processed in the SPT for the landmark u, and d is the distance from u to v.

The PLT-precompute algorithm is illustrated with reference to FIG. 3. At 301, the queue is initialized with the set $\{(u; u; 0): u \in U\}$. This set corresponds to performing the BFS "in parallel" from all the landmarks. The difference with the regular BFS is that each node can be visited by at most r different landmarks. This is implemented by keeping track of the set of associated landmarks L(v) for each node:

$L(v)=\{u:p_u[v]\neq(\text{nil})\}$

No further traversal of a node is allowed when it has already been visited by r landmarks, where r is set prior to the precomputation.

At 302, the queue is de-queued until the queue is emptied. This corresponds to associating each node that fulfils the initial distance criteria with a landmark (i.e. distance is nil in the first instance).

At 303, the distance is increased by one unit and the landmarks are re-enqueued. The unit is determined in dependence on the type of query to be performed and on the format in which the data is processed. It is understood that the unit could represent a range of distances (for example, when processing shortest paths in maps).

Steps 302 and 303 then repeat in order until the Step 304, when there is a resulting set L(v) for each node v that contains the min(r; k') closest landmarks for node v, where k' is the number of landmarks in the connected component of node v.

At 305, the precompute process ends.

An example algorithm of the PLT-Precompute algorithm is provided as Algorithm 5 below.

```
Algorithm 5 PLT-PRECOMPUTE

Require: Graph G = (V, E), a set of landmarks U ⊂
    V, number of landmarks per node r.
 1: procedure PLT-PRECOMPUTE
 2:     for v ∈ V do              ▷ Initialize empty arrays
 3:         c[v] ← 0
 4:         for u ∈ U do
 5:             p_u[v] ← nil
 6:             d_u[v] ← ∞
 7:         end for
 8:     end for
 9:     Create an empty queue Q.
10:     for u ∈ U do               ▷ Initialize queue
11:         Q.enqueue((u, u, 0))
12:         p_l[l] ← l
13:         d_l[l] ← 0
14:     end for
15:     while Q is not empty do
16:         (u, v, d) ← Q.dequeue( )
17:         for x ∈ G.adjacentNodes(v) do
18:             if p_u[x] = nil and c[x] < r then
19:                 p_u[x] ← v
20:                 d_u[x] ← d + 1
21:                 c[x] ← c[x] + 1
22:                 Q.enqueue((u, x, d + 1))
23:             end if
24:         end for
25:     end while
26: end procedure
```

Figure 4:
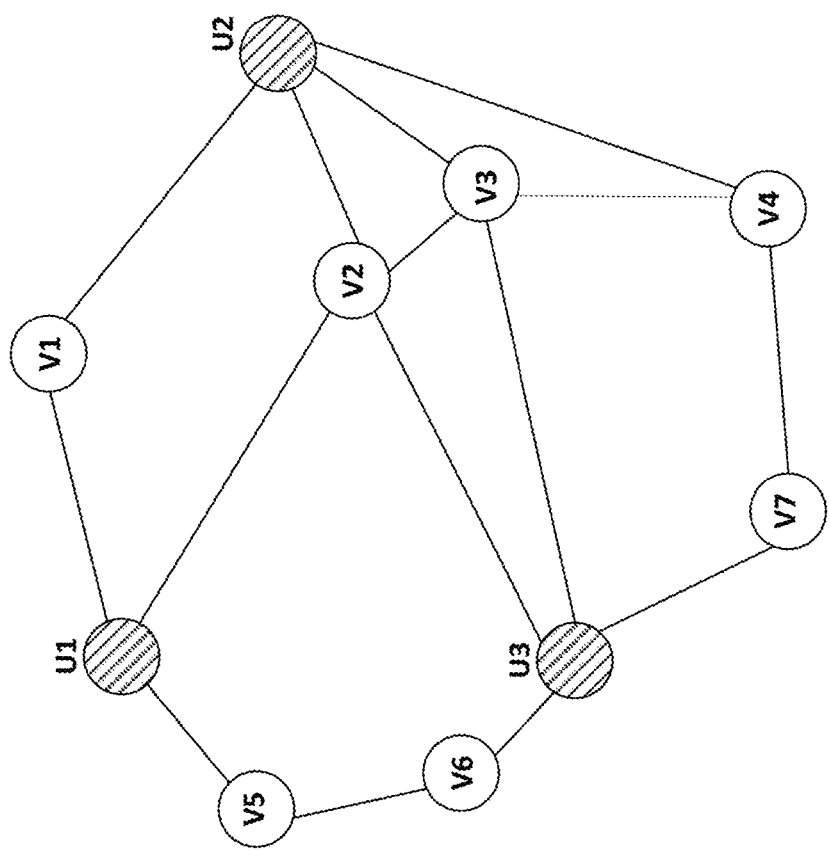
FIG. 4 illustrates a plurality of connected nodes and landmarks.

FIGS. 4 to 6 illustrate the difference between the PLT-precompute algorithm described above and the known SPT precompute algorithm for landmarks.

In FIG. 4, there is shown a plurality of vertices. The vertices consist of landmarks $u_1$, $u_2$ and $u_3$ and nodes (that are not landmarks) $v_1$ to $v_7$. There are a plurality of connections between the vertices in the network so that a path exists to every vertex. The connections are represented in FIG. 4 by straight lines extending between the circular nodes and landmarks.

Figure 5C:
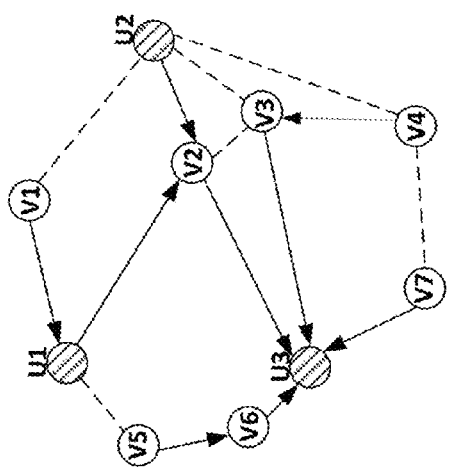
FIGS. 5A to 5C depict various shortest path trees.
Figure 5B:
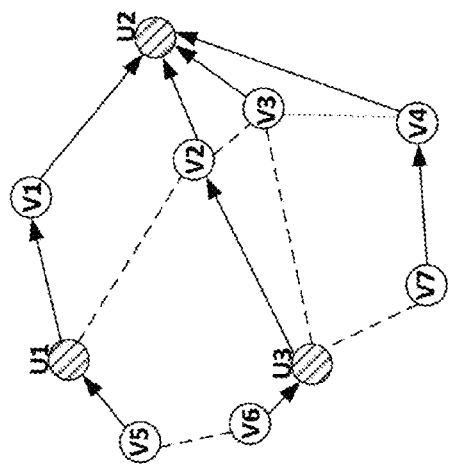
Figure 5A:
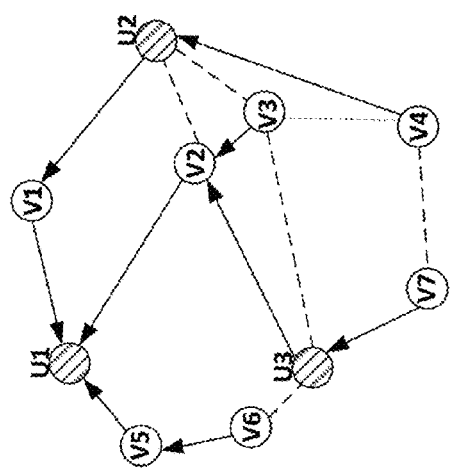

FIG. 5A depicts a shortest path tree rooted at $u_1$. In this case, all nodes are associated with landmark $u_1$ through a shortest path distance to $u_1$. The shortest path is determined and stored in a memory structure in a computer device. The connections not forming part of the shortest path tree rooted at $u_1$ are represented as dashed lines in FIG. 5A whilst the connections forming part of the shortest path tree rooted at $u_1$ are represented as solid arrows.

FIG. 5B depicts a shortest path tree routed at $u_2$. In this case, all nodes are associated with landmark $u_1$ through a shortest path distance to $u_2$. The shortest path is determined and stored in a memory structure in a computer device. The connections not forming part of the shortest path tree rooted at $u_2$ are represented as dashed lines in FIG. 5B whilst the connections forming part of the shortest path tree rooted at $u_2$ are represented as solid arrows.

FIG. 5C depicts a shortest path tree routed at $u_3$. In this case, all nodes are associated with landmark $u_1$ through a shortest path distance to $u_3$. The shortest path is determined and stored in a memory structure in a computer device. The connections not forming part of the shortest path tree rooted at $u_3$ are represented as dashed lines in FIG. 5C whilst the connections forming part of the shortest path tree rooted at $u_3$ are represented as solid arrows.

Figure 6C:
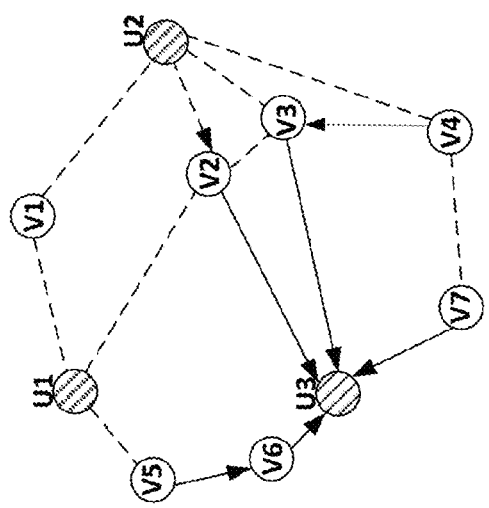
FIGS. 6A to 6C depict various pruned landmark trees.
Figure 6B:
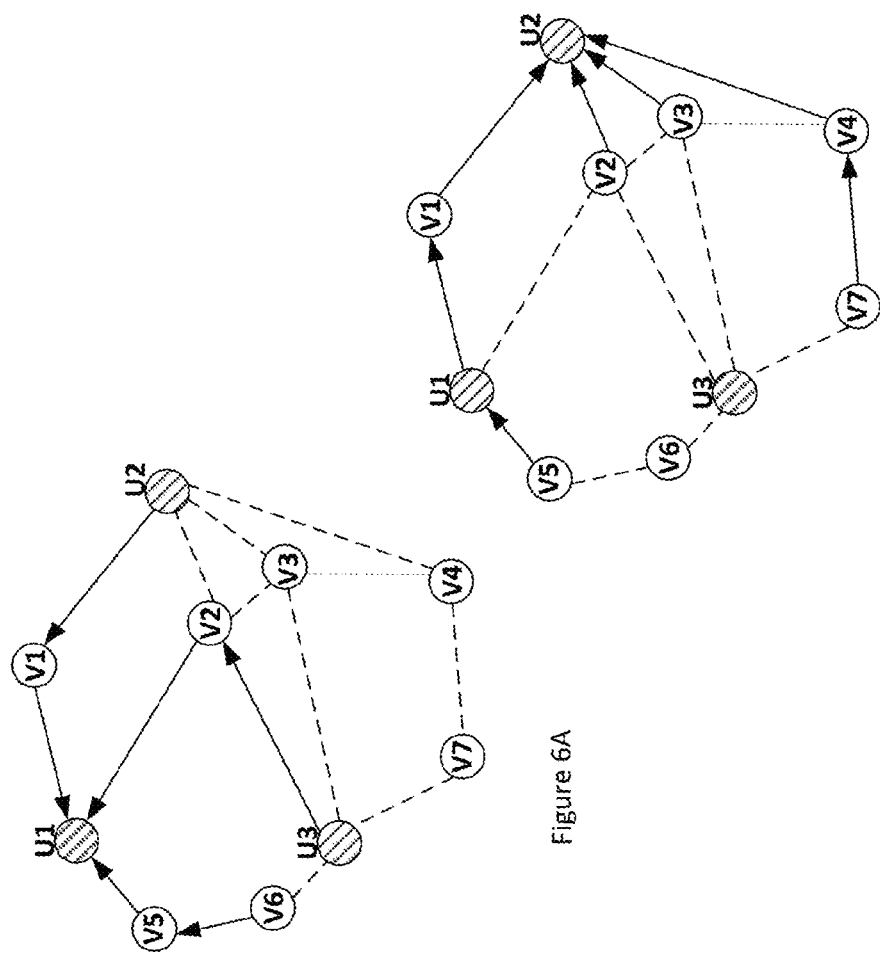
Figure 6A:
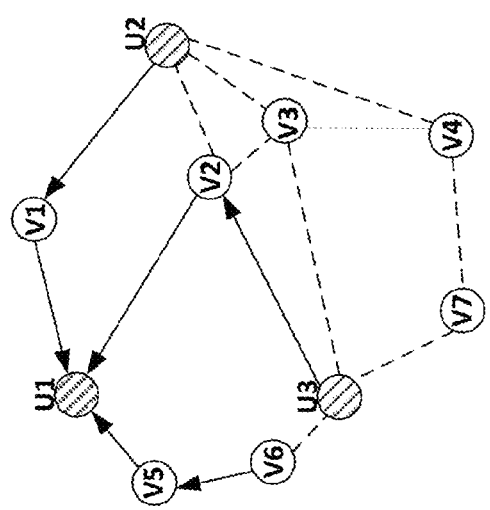

FIGS. 6A to 6C depict, respectively, the pruned landmark trees according to the embodiments described above in relation to FIG. 3 for the landmarked nodes $u_1$, $u_2$, $u_3$. As shown cumulatively, in these figures, no single node is associated with more than 2 landmarks (i.e. r=2 landmarks per node). These pruned landmark trees are determined and stored in a memory structure in a computer device. The connections not forming part of the pruned landmark trees r the landmarked nodes $u_1$, $u_2$, $u_3$ are represented as dashed lines in FIGS. 6A to 6C whilst the connections forming part of the respective pruned landmark trees are represented as solid arrows.

Below a proof is provided showing that Algorithm 5 (PLT-Precompute) selects the set L(v) of the closest landmarks for each node v ∈ V. The size of the set |L(v)| is equal to min(r; k'), where k' is the number of landmarks in the connected component of v.

First, let the set of landmarks be U={$u_1$; : : : ; $u_k$}. Without loss of generality, an ordering among the landmarks is assumed (e.g. landmark $u_1$ will be considered to be preceding $u_2$, denoted as u1←u2) and that the landmarks are first pushed into the queue on lines 10 to 14 of the algorithm in this particular order. At first the queue Q contains k tuples of the form (u; u; 0), ordered according to the landmark ordering. After k iterations of line 16, those tuples are removed from the queue and instead a number of elements of the form (u; x; 1) is enqueued, where the distance value is 1 and the landmarks are again in the correct order. Continuing in this fashion, for the dequeued distance-1 elements, some new node elements having a distance value of 2 are pushed into the correct order of landmarks. This process repeats, with the distance increasing at each iteration. It is thus easy to see that the following must hold:

Lemma 1: Tuple (u; x; $d_1$) can be enqueued before (l; y; $d_2$) only if $d_1 < d_2$ or ($d_1 = d_2$ and u←l).

To prove this, consider some node v ∈ V. When there are k' landmarks in the connected component of v, where k'≤r, the condition on line 18 of Algorithm 5 may become false for some node only after is already associated with all the landmarks. Thus, a full traversal of the component will be performed for each landmark and L(v) will contain all k' of them (possibly zero, if k'=0).

The remainder of the proof assumes there are at least r+1 landmarks in the same connected component as v. Suppose that after completing the algorithm a landmark u ∈ U (from the same connected component) is not in L(v). In other words, $p_u[v]$=nil. It follows that there exists at least r other landmarks {$l_1$; : : : ; $l_r$} such that for each landmark $l_i$, either landmark $l_i$ is closer to node v than node u, or at the same distance, but preceding node u (i.e. $l_i$←u). Consider two cases.

In the first case, there exists a neighbour w of node v, such that $p_u[w]$≠nil. In this case a tuple (u;w;') must have been added to the queue Q at some point (as executing line 19 implies that line 22 is also executed). At some later moment this tuple was dequeued on line 16 and all neighbours of w, including v were iterated over. As (u; v; ') was not enqueued, at that moment c[v]=r. This means that for r other landmarks $l_i$ a tuple ($l_i$; v; ') had been enqueued already. It follows from Lemma 1 that those landmarks were either closer to v than u or at the same distance, but preceding.

In the second case, no neighbours of v have u in their landmark sets. Consider the shortest path $\pi_{v;u}$=(v;$w_1$; $w_2$; : : : ; u). As it is known from line 12 of Algorithm 5 that u ∈ L(u), and u is not an element if the set L(v), there must exist a node $w_j$ along the path such that u is not an element of the set L($w_j$), but u ∈ L($w_{j+1}$). Repeating the logic of the first case, it is concluded that there exists r distinct landmarks h which are closer to $w_j$ than the node u (or at the same distance, but preceding). But if d($w_j$; $l_i$)≤d($w_j$; u), then d(v; $l_i$)≤d(v;$w_j$)+d($w_j$;$l_i$)≤d(v;$w_j$)+d($w_j$;u)=d(v; u). Hence, any of the landmarks $l_i$ is also either closer to v than u or at the same distance but preceding.

If u is not an element of the set L(v), there are r other landmarks closer to v than u. It remains to be shown that after the PLT algorithm completes, |L(v)|=r for all nodes v. If it is assumed that this is not true for some v, i.e. L(v)<r, then the condition on line 18 was never false for v. Hence, if any landmark u was ever associated with a neighbour w of v, landmark u was also have been associated with v, i.e. L(w) ⊂ L(v) and |L(w)|<r. This logic may be repeated recursively, until ultimately concluding that for any other node w in the same connected component, L(w) ⊂ L(v) and also $U_w L(w) \subset L(v)$. The set $U_w L(w)$, contains all the landmarks from the connected component. As it is assumed that there is more than r of them, $$r < |U_w L(w)| \le |L(v)|$$

which is a contradiction. Thus |L(v)|=r for all nodes v.

Once a pruned tree has been precomputed and stored in an appropriate form, the pruned tree may be used for processing search queries. In such a case, a computer device receives a search query in the form of a digital message identifying a source node and a target node in the network of interconnected nodes represented by the graph mentioned above. The computer device executes operations suitable for providing a response to such a search query. For example, the computer device may first access the above described data structure, in which a path tree is stored for each landmark node. A path tree of a landmark node indicates a separation between the landmark node and each of a plurality of nodes in the interconnected network. Each of said plurality of nodes appears in no more than a predetermined number of path trees. From the accessed data structure, landmarks are identified having at least one of the source node and the target node in their path tree. At least one of the identified landmarks is used to determine a search result relating to the search query.

The search result may be provided using two of the identified landmarks. Distances between landmarks may be stored to approximate the separation between the source and the target.

The search result may be modified before it is provided to an originator of the search query. One modification would be to remove cycles (as described below). Cycles can be removed by detecting whether any nodes appear at least twice in the search result and modifying the search result in order that each node only appears once i.e. so that a node is not revisited in the determined path. Alternatively or in addition, the search result may be modified to take account of connections between nodes that are present in the interconnected network but that are not present in any of the path trees (such as including a breadth first search algorithm in the executed search algorithm, as described in relation to PLT-BFS below).

At least one of the interconnected nodes may be a witness node as described above. The computer device may identify a witness node associated with the at least two identified landmarks. The association may be an indication of a separation between the witness node and each of said identified landmarks or may simply be an indication of the identity of each of the identified landmarks. The search result is provided in dependence on the indication by effectively using the witness node as a landmark to the identified landmarks.

The search result may be presented to an originator of the search query, such as a user.

As described above, the landmark-basic approximation technique is based on the simple triangle inequality. Applying the same algorithm directly to pruned landmark trees does not guarantee that both nodes will, for any pair of nodes (s; t), share any common landmarks (i.e. that both the source and target nodes s and t will belong to the shortest path tree of the same landmark). To address this problem, a pair of landmarks u∈L(s) and v∈L(t) are used in the shortest path distance approximation as well as a precomputed distance d(u; v) between the landmarks u, v in question. In particular, the distance $d_{approx}(s; t)$ between two nodes s and t can be approximated by using the equation:

$$d_{approx}(s;t) \approx d(s;u) + d(u;v) + d(v;t):$$

To obtain a good approximation, all pairs of landmarks (u; v)∈L(s)×L(t) are iterated over and a pair of landmarks is chosen that produces the smallest approximation. This method is referred to herein as the PLT-Basic. If there are common landmarks between the source and target nodes s,t, for those landmarks this method produces the same result as the Landmarks-Basic algorithm. An example PLT-Basic algorithm is provided below as Algorithm 6.

---
Algorithm 6 PLT-BASIC
---

Figure 7:
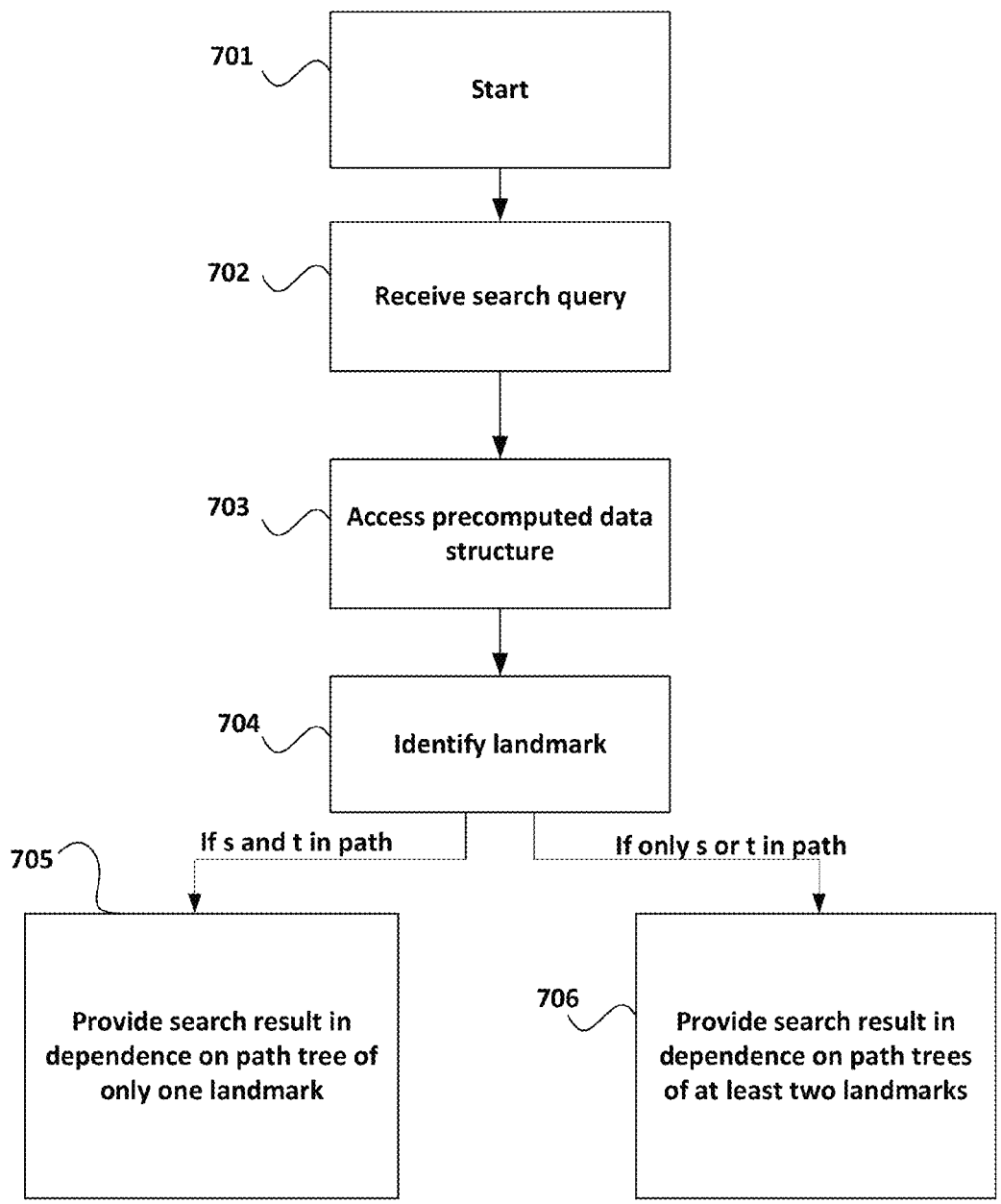
FIG. 7 illustrates a search query.

Require: Graph G = (V, E), a set of landmarks U,
    precomputed distance $d_u[x]$ from each node x to
    each landmark u ∈ L(v), precomputed distance
    d[u, v] for each pair of landmarks (u, v) ∈ U × U.
1: function PLT-BASIC(s, t)
2:    $d_{min} \leftarrow \infty$
3:    for u ∈ L(s) do
4:      for v ∈ L(t) do
5:        $d \leftarrow d_u[s] + d[u, v] + d_u[t]$
6:        $d_{min} \leftarrow \min(d_{min}, d)$
7:      end for
8:    end for
9:    return $d_{min}$
10: end function The PLT-Basic algorithm is illustrated in relation to FIG. 7. At 701, the process starts.

At 702, a computer device receives a search query. The search query is in the form of a digital message and identifies a source node and a target node in a network of interconnected nodes. At least one of the interconnected nodes is a landmark node.

Figure 3:
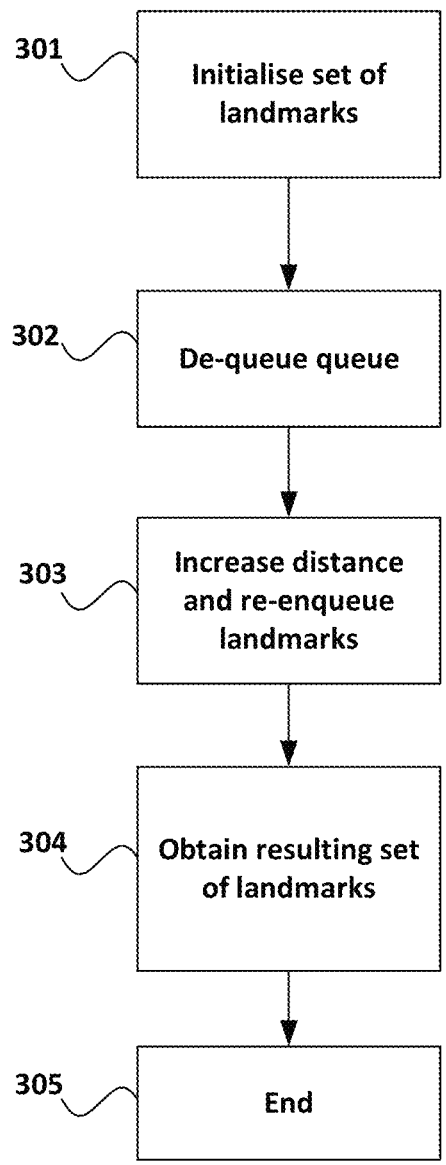
FIG. 3 illustrates a pre-computation process.

At 703, the precomputed data structure referred to above in relation to FIG. 3 is accessed in dependence on the search query. In the precomputed data structure, each landmark node has stored therewith a path tree. A path tree is a set of links, with each link identifying an adjacent node in the network. Each node in the network is in the path tree of no more than a predetermined number of network nodes.

At 704, landmarks having at least one of the source node and the target node in their path tree are identified.

If at least one landmark having both the source node and the target node in their path tree is identified at 704, the process proceeds to 705. At 705, a search result is provided in dependence on distances associated with each of the source and target nodes in the path tree of the at least one landmark.

If only those landmarks having only one of the source node and the target node in their path tree is identified at 704, the process proceeds to 706. At 706, a search result is provided in dependence on both distances associated with the source and target nodes from the identified landmarks and in dependence on a precomputed distance between two identified landmarks.

A path tree may be a shortest path tree. By this, it is meant that each node is limited, or otherwise constrained to appear in only the path trees of the closest landmarks. The closest landmarks to a node are those landmarks having the smallest separation from said node.

This process can be illustrated using the pruned landmark trees from FIGS. 6A to 6C.

Suppose that the distance between nodes $v_5$ and $v_4$ needs to be estimated. When using landmarks $u_1$ and $u_2$ the resulting approximate shortest path is computed to be ($v_5$; $u_1$)+($v_1$; $u_2$)+($u_2$; $v_4$), which has a length of 4. The two nodes $v_5$ and $v_4$ are also both present in the landmark tree rooted at $u_3$. Hence the PLT-Basic algorithm will also find the path ($v_5$; $v_6$; $u_3$)+($u_3$; $v_3$; $v_4$), which also has a length of 4.

Figure 8B:
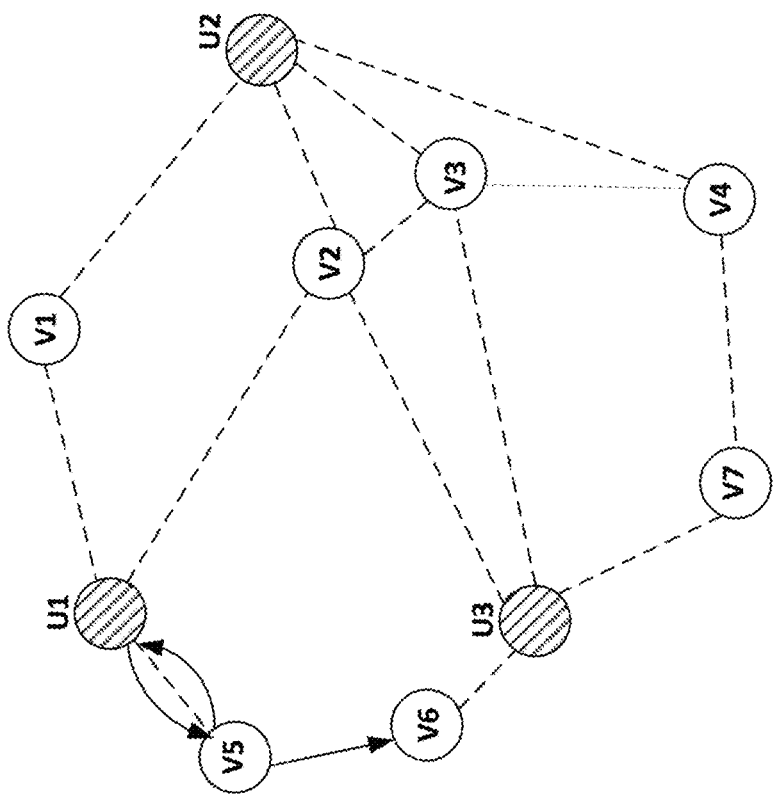
FIGS. 8A and 8B illustrate cycles in search results.
Figure 8A:
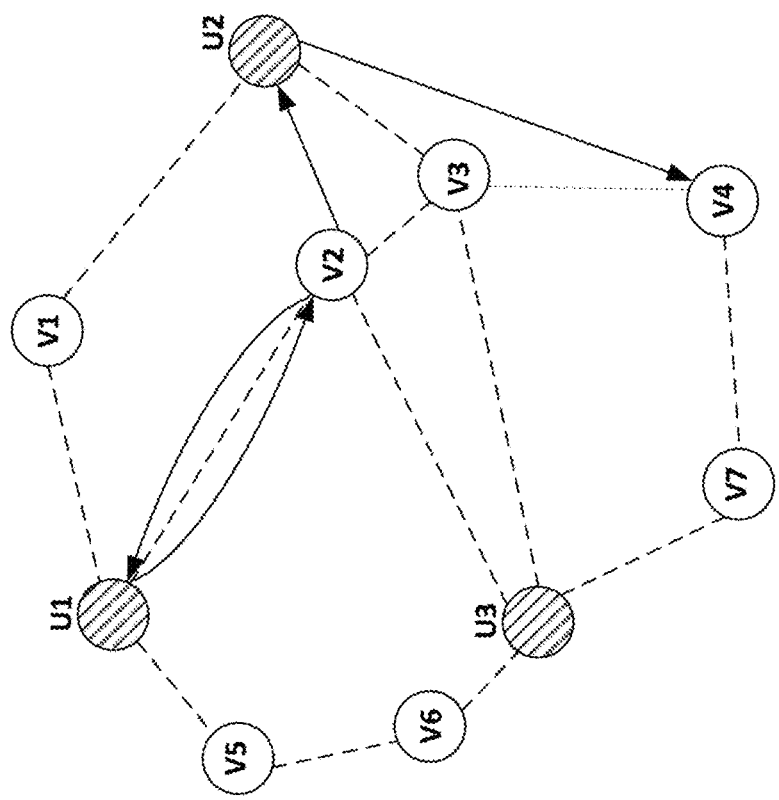

The PLT-Basic algorithm can result in a path comprising a cycle. A cycle exists when a particular node is revisited when determining the shortest path. This is illustrated in FIGS. 8A and 8B. In each figure, the connections in the interconnected networks of nodes is represented by dashed lines extending between nodes whilst arrows form the path determined by the landmarks basic algorithm.

In FIG. 8A, the shortest path from node $v_2$ to node $v_4$ passes from node $v_2$ to landmark $u_1$, before passing to landmark $u_2$ via node $v_2$. From landmark $u_2$, the shortest path passes to $v_4$. Thus in this case, the node $v_2$ is revisited, resulting in a cycle i.e. $v_2 \rightarrow u_1 \rightarrow v_2$.

In FIG. 8B, source node $v_5$ is adjacent to both target node $v_6$ and landmark $u_1$. Consequently, when finding the shortest path from the source node to the target node using the PLT basic algorithm, the algorithm returns to path: $v_5 \rightarrow u_1 \rightarrow v_5 \rightarrow v_6$. Consequently, the node $v_5$ is revisited, resulting in a cycle i.e. i.e. $v_5 \rightarrow u_1 \rightarrow v_5$.

To mitigate against this effect, the PLT-Basic algorithm may be modified to implement a cycle elimination technique (known as the PLT-CE algorithm). The PLT-CE method can be regarded as a pruned version of the previous Landmarks-LCA approach.

In the PLT-CE algorithm, actual paths (and not just distances) are precomputed and stored in the data structure. Cycles may then be eliminated using a stack and a set data structures to remove the loops (as shown in the example Algorithm 7, provided below). The Path-To subroutine in Algorithm 7 is the same as the Path-To subroutine in the Landmarks-LCA algorithm (Algorithm 3) and returns the shortest path in the shortest path tree $p_u$ from the source node s to the closest node q belonging to the path between the source node s and the target node t. The issue of efficiently obtaining pieces of the path between the landmarks (the Path-Between function) is discussed below.

---
Algorithm 7 PLT-CE
---

Require: Graph G = (V, E), a set of landmarks U, a
PLT parent link $p_u[x]$ precomputed for each u ∈
L(x), x ∈ V.
1: function ELIMINATE-CYCLES(π)
2:   S ← ∅
3:   T ← Empty stack
4:   for x ∈ π do
5:     if x ∈ S then
6:       while x ≠ T.top( ) do
7:         v ← T.pop( )
8:         Remove v from S.
9:       end while
10:    else
11:      Add x to S
12:      T.push(x)
13:    end if
14:  end for
15:  return T, converted from a Stack to a Path ---
Algorithm 7 PLT-CE
---

16:  end function
17: function PLT-CE(s,t)
18:   $d_{min}$ ← ∞
19:   for u ∈ L(s) do
20:     for v ∈ L(t) do
21:       π ←   PATH-TO(s, (u)) +
22:             PATH-BETWEEN(u, v) +
23:             REVERSED(PATH-TO(t, (v)))
24:       d ← |ELIMINATE-CYCLES(π)|
25:       $d_{min}$ ← min($d_{min}$, d)
26:     end for
27:   end for
28:   return $d_{min}$
29: end function If the PLT-Basic and PLT-CE algorithms are applied to determine the distance between landmark node $u_1$ and node $v_3$ of FIGS. 6A to 6C, then a distance of 3 is returned in each case. However, the true shortest path ($u_1$; $v_2$; $v_3$) is of distance 2. This path is not picked up on using the PLT-Basic and PLT-CE algorithms as the edge between nodes $v_2$ and $v_3$ is not present in any of the used PLTs.

This can be addressed using a similar approach to the way in which the Landmark-BFS algorithm addresses this problem. More particularly, the previous Landmarks-BFS algorithm approaches this problem by running a breadth-first-search (BFS) on a subgraph induced by the source and destination nodes and the paths from these to all the landmarks. This method makes use of shortcuts (edges that are present in the graph but that are not present in landmark trees). This method thus uses the interconnected node graph itself. Another benefit of running BFS is that it always returns a path that does not contain cycles.

An example modified BFS (PLT-BFS) algorithm is presented below as Algorithm 8. Algorithm 8 is the adapted version of Landmarks-BFS that operates on pruned landmark trees. This time the induced graph is constructed on a set of vertices composed of all shortest paths from the source and destination nodes s and t to their known landmarks L(s) and L(t), as well as all nodes on the inter-landmark paths $\{\pi_{u,v} | u \in L(s), v \in L(t)\}$.

---
Algorithm 8 PLT-BFS
---

Require: Graph G = (V, E), a set of landmarks U, an
SPT parent link $p_u[x]$ precomputed for each u ∈
L(x), x ∈ V.
1: function PLT-BFS(s,t)
2:   S ← ∅
3:   for u ∈ L(s) ∪ L(t) do
4:     S ← S ∪ PATH-TO(s, (u))
5:     S ← S ∪ PATH-TO(t, (u))
6:   end for
7:   for u ∈ L(s) do
8:     for v ∈ L(t) do
9:       S ← S ∪ PATH-BETWEEN(u, v)
10:    end for
11:  end for
12:  Let G[S] be the subgraph of G induced by S.
13:  Apply BFS on G[S] to find
14:  a path π from s to t.
15:  return |π|
16: end function All the three described algorithms (PLT-Basic, PLT-CE, PLT-BFS) use the precomputation of the separation between each pair of landmarks. The separation may be stored as an actual distance and/or as a shortest path. The straightforward method for obtaining a shortest path is to run a BFS from each landmark and to save distances to all other ones. Such a procedure, however, uses O(k(m+n)) time for k landmarks, where n is the number of nodes in the graph and M is the number of edges in the graphs. As previously mentioned, an edge is a connection (either physical or logical) between two nodes in an interconnected network of nodes.

Approximations of inter-landmark shortest path distances can be calculated from the data already collected during the PLT-Precompute algorithm. Fundamentally, the idea is to find a witness node w[u; v] for each pair of landmarks u∈U and v∈U such that witness node w[u; v] is present in the pruned landmark trees for both u and v. In mathematical notation, this can be expressed as {u, v}CL(w[u, v]). The approximation of the distance between the landmarks can then be computed through this witness node as $d_u$[w[u, v]]+$d_v$[w[u, v]]. In other words, the witness effectively functions as a landmark in the subgraph consisting of landmark nodes of the full graph and witness nodes. The approximate path between the landmarks can be restored using the witness node.

An example Path-Between Landmarks Algorithm is provided as Algorithm 9 below. Algorithm 9 first uses an algorithm to determine a witness node to use in the Calculate-Witness Nodes procedure. This is useful when several witness nodes exist for a pair of landmarks as the algorithm can be configured to return the witness node that minimizes the distance approximation. When this procedure finishes, i.e. when the witness node w[u,v] is calculated, approximate shortest paths between the landmarks can be obtained using the function Path-Between. By using the Path-Between function, Algorithm 9 uses the distance between the landmark u and the witness node(s) w[u,v] and the distance between the landmark v and the witness node(s) w[u,v] to calculate a path between landmarks u and v (as described above).

---

Algorithm 9 PATH-BETWEEN-LANDMARKS

---

Require: Graph G = (V, E), a set of landmarks U, an
SPT parent link $p_u$[x] and a distance value $d_u$[x]
precomputed for each u ∈ L(x), x ∈ V.
1: procedure CALCULATE-WITNESS-NODES
2:   for x ∈ V, u ∈ L(x), v ∈ L(x) do
3:     if w[u, v] = nil or
4:       ($d_u$[x] + $d_v$[x] <
5:       $d_u$[w[u, v]] + $d_v$[w[u, v]]) then
6:         w[u, v] ← x
7:     end if
8:   end for
9: end procedure
10: function PATH-BETWEEN(u,v)
    Returns the path between landmarks u and v
11:   π ← PATH-TO(w[u, v], (u)) +
12:     REVERSED(PATH-TO(w[u, v], (v)))
13:   return π
14: end function

---

The proposed modifications to the traditional landmark algorithms affect their runtime complexity twofold. On one hand, computation of pruned landmark trees results in each node and each edge being visited up to r times and therefore pruned trees can be built in O(r(m+n)) time. This is more efficient compared to the O(k(m+n)) complexity of computing full SPTs in the regular landmark-based methods. On the other hand, the need to precompute distances between pairs of landmarks introduces an additional O($r^2$n) term into the time taken to precompute.

The time per query of the original methods was linear in the number of landmarks, O(k). In the proposed approaches the query time does not depend on the total number of landmarks, but rather is O($r^2$), as the search is performed over pairs of landmarks. Thus, both in precomputation and query time the new approaches are comparable to the previous ones whenever $r^2$≈k.

In terms of space complexity, the new methods use O(rn) space to keep landmark data, in addition to O($k^2$) space for storing inter-landmark witness nodes or distances.

The present data structure and searching query was tested using data from four real-world social network graphs at different times; Provider 1, Provider 2, Provider 3 and Provider 4. These networks were selected to represent networks having four different orders of magnitude in terms of network size. A brief description of each network is provided below.

The Provider 1 dataset contains bibliographic information of computer science publications. Every vertex corresponds to an author. Two authors are connected by an edge if they have co-authored at least one publication.

Provider 2 is a large social networking website. The Provider 2 dataset is a graph, where each user corresponds to a vertex and each user-to-user connection is an edge.

Provider 3 is a microblogging site that allows users to follow each other, thus forming a network. Although originally the network is directed, in the following edge direction is ignored.

Provider 4 is a large social network for peer-to-peer communication. Two users are connected by an edge if they are in each other's contact list.

The properties of these datasets are summarized in Table 1. The table shows the number of vertices |V|, number of edges |E|, average distance between vertices d (computed on a sample vertex pairs), approximate diameter Δ, fraction of vertices in the largest connected component |S|/|V|, and average time $t_{BFS}$ to perform a BFS traversal over the graph.

TABLE 1

Datasets.

| Dataset | Provider 1 | Provider 2 | Provider 3 | Provider 4 |
|---|---|---|---|---|
| |V| | 770K | 3.1M | 41.7M | 454M |
| |E| | 2.6M | 117M | 1.2B | 3.1B |
| d | 6.25 | 5.70 | 4.17 | 6.7 |
| Δ | 23 | 10 | 24 | 60 |
| |S|/|V| | 85% | 100% | 100% | 85% |
| $t_{BFS}$ | 345 ms | 8 sec | 9 min | 20 min |

In each experiment 500 pairs of vertices (s;t) were randomly chosen from each graph and the true distance between the source and target nodes s,t was precomputed for each pair by applying the BFS algorithm. The proposed distance approximation algorithms (PLT-Basic, PLT-CE and PLT-BFS) were then applied to these pairs and the average approximation error and query execution time were determined.

The approximation error is computed as (l'−l)/l, where l is the approximation and l' is the actual distance. Query execution time refers to the average time for computing a distance approximation for a pair of vertices.

All experiments were run under Scientific Linux release 6.3 on a server with 8 Intel Xeon E7-2860 processors and 1024 GB RAM. Only a small part of the computational resources was used in all experiments. The described methods were implemented in Java. Graphs and intermediate data were stored on disk and accessed through memory mapping.

As the proposed methods are focused on using larger number of landmarks than the previous techniques scalable selection strategies are considered. The following comparisons use two strategies: Random selection and Highest degree selection. These strategies are known to a person of ordinary skill in the art.

In random selection the same nodes are used in the experiments with equal landmark set sizes in order to make results more comparable.

FIGS. 9A to 9D respectively present the approximation error for Provider 1, Provider 2, Provider 3 and Provider 4 graphs. The error values are present for different landmark selection strategies (rows), algorithms (columns), numbers of landmarks per node (bar colors) and number of landmarks (x-axis). The dashed black line in each graph is a reference baseline for each of the PLT algorithms. Landmark Basic is used as the baseline for PLT-Basic, Landmark-LCA is used as the baseline for PLT-CE and Landmark-BFS is used as the landmark for PLT-BFS. Each of the baseline algorithms is used with 100 landmarks.

Landmark selection strategy is a significant factor for approximation quality, especially for PLT-Basic and PLT-CE algorithms. For the PLT-BFS method, however, randomly selected landmarks provide accuracy comparable with the highest degree method and sometimes even outperform them, as in the case for the Provider 3 graph.

As one might expect, a higher number r of landmarks per node leads to consistent reduction of the approximation error.

The obtained results also confirm that the accuracy of the different algorithm highly depends on the internal properties of the constructed graphs themselves. While the PLT-BFS method can return exact values in almost all cases on the Provider 1 graph (approximation error less than 0.01), the lowest obtained error for the Provider 4 graph is still as high as 0.09 for the same method.

Query time was computed as the average value among 500 random queries in each graph. The total measured time excludes time needed to load the index into main memory, but as it may be that not all the data is immediately loaded into RAM, a part of the measured time may also include time for loading parts of the index file.

Figure 10:
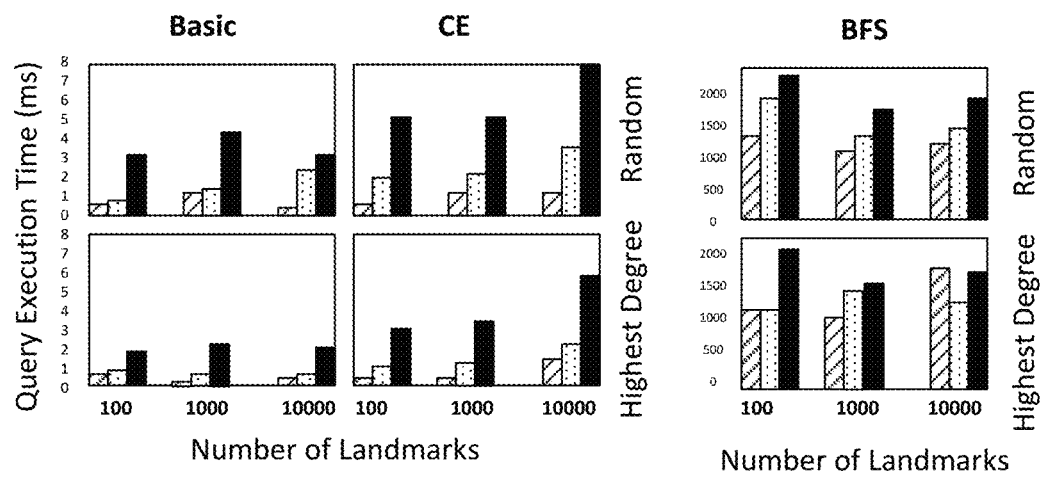
FIG. 10 illustrates an average query time for FIG. 9D.

FIG. 10 presents the results. In relation to this particular embodiment, we note the following. The timing has a quadratic dependency on the number of landmarks per node r, as expected. The query time depends mostly on the choice of the algorithm and the graph. The average query time of PLT-Basic and PLT-CE methods does not exceed 9 milliseconds for 20 landmarks/node and is less than a millisecond for 5 landmarks/node in most cases. Unlike these two methods, the performance of the PLT-BFS highly depends on the dataset and the landmark selection strategy. For example, with 20 landmarks/node and the highest degree strategy the results vary from 9 milliseconds on the Provider 1 graph to 4.2 seconds on the Provider 3 graph.

The preprocessing time is substantially independent of the number of landmarks and their selection strategy. Table 2 contains time values obtained during the pruned landmark trees computation for different values of number of landmarks per node in each dataset. The data was collected for 1000 highest degree landmarks. The time taken compute the pruned landmark tree depends on the size of the graph. For example, for 20 landmarks/node it ranges from about 21 seconds in Provider 1 to almost 45 hours in Provider 4.

TABLE 2

Preprocessing time for 1000 landmarks with highest degree selection strategy

| | Landmarks/Node | | |
|---|---|---|---|
| Graph | 5 | 10 | 20 |
| Provider 1 | 3.6 s | 8.6 s | 21.1 s |
| Provider 2 | 87 s | 207 s | 463 s |
| Provider 3 | 48 m | 105 m | 247 m |
| Provider 4 | 4.4 h | 18.6 h | 44.9 h |

A benefit of the proposed methods relates to memory savings. Whilst the previous approaches use (kn) space to store k complete landmark trees, the requirements for pruned landmark trees are $O(rn+k^2)$, which is significantly smaller whenever k<<n. The described property can be observed in Table 3, which shows the total amount of disk space consumed by the indexing structures. For small r values, the sizes for Provider 1 and Provider 2 graph significantly depend on the total number of landmarks. For the larger Provider 3 and Provider 4 graphs this effect is reduced. The last column of Table 3 shows the baseline scenario of using 100 full landmark shortest path trees.

To store the trees, a compact representation is used, where for each node r (landmark id, node id) pairs are kept. The nodes are identified using 32-bit numbers. However, it is known to a person of ordinary skill in the art that other representations (for example, using more bits or less bits) could be used for identifying each node. The way of identifying the nodes may be selected in dependence on the total number of nodes in the graph.

With respect to previous related work, the present system allows comparable or improved accuracy and similar query time to be achieved with decreased memory and disk space usage. For example, when compared to the baseline 100-landmark methods, the proposed methods with k=1000 highest degree landmarks and r=20 landmarks per node show consistently improved performance in terms of accuracy on all the tested graphs and uses 2-2.5 times less disk space. With k=100 and r=5 the PLT approach underperforms only slightly in terms of accuracy, yet uses 5 times less space and 3 times less time per query.

The methods were presented for the case of undirected unweighted graphs, but, similarly to the previous approaches, they can be straightforwardly generalized by a person of ordinary skill in the art to support weighed and directed graphs. In addition, pruned landmark trees can be dynamically updated under edge insertions and deletions.

TABLE 3

Total PLT index memory usage

| | | Landmarks/Node | | | Baseline |
|---|---|---|---|---|---|
| Graph | Landmarks | 5 | 10 | 20 | (100 SPTs) |
| Provider 1 | 100 | 30M | 59M | 117M | 300M |
| | 1000 | 34M | 63M | 121M | |
| | 10000 | 411M | 441M | 499M | |
| Provider 2 | 100 | 118M | 235M | 469M | 1.2G |
| | 1000 | 122M | 239M | 473M | |
| | 10000 | 499M | 616M | 851M | |
| Provider 3 | 100 | 1.6G | 3.2G | 6.3G | 16G |
| | 1000 | 1.6G | 3.2G | 6.3G | |
| | 10000 | 2.0G | 3.5G | 6.6G | |

TABLE 3-continued

Total PLT index memory usage

| Graph | Landmarks | Landmarks/Node | | | Baseline |
| | | 5 | 10 | 20 | (100 SPTs) |
| --- | --- | --- | --- | --- | --- |
| Provider 4 | 100 | 21G | 41G | 81G | 170G |
| | 1000 | 21G | 41G | 81G | |
| | 10000 | 21G | 41G | 81G | |

Algorithms for finding the shortest path between two nodes can be used for a plurality of different applications. For example, they may be used in route-finding algorithms for maps, in citation maps for authors and for any determination of a connection between two objects.

In the above described PLT embodiments, a search result has been obtained using separations between landmarked nodes and nodes in their path trees. In this context, the term separation includes at least one of distances and path lengths. Distances can be represented using any appropriate metric, such as, for example, a number of hops or a magnitude relating to some physical distance. A path length can be represented using a chain of adjacent nodes. Indicators of each of the adjacent nodes can be provided with the path length.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the computer devices may also include an entity (e.g. software) that causes hardware of the user terminals to perform operations, e.g., processors functional blocks, and so on. For example, the computer devices may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of processing a search query to provide a search result, the method comprising:
   receiving at a computer device a search query in the form of a digital message, the query identifying a source node and a target node in a network of interconnected nodes, at least one of the interconnected nodes being a landmark node; and
   executing at the computer device an application for generating a search result, the application performing operations of:
      accessing a data structure from a memory of the computer device in which the landmark node has stored therewith a path tree that indicates a separation between the landmark node and each of a plurality of nodes, each of said plurality of nodes being limited to appearing in no more than a predetermined number of path trees;
      identifying the landmark node in the accessed data structure having at least one of the source node and the target node in their path tree; and
      determining a search result related to the path tree of the identified landmark node.

2. A method according to claim 1, wherein the data structure has stored, for each landmark node, an indication of a separation to at least one other landmark node.

3. A method according to claim 1, wherein the data structure has stored, for each landmark node, an indication of a separation to every other landmark node.

4. A method according to claim 1, wherein the determining the search result is related to two of said landmark nodes and uses an indication of a separation between said two landmark nodes.

5. A method according to claim 1, wherein the application further performs:
   detecting whether any nodes appear at least twice in the search result; and, if so detected, modifying the search result such that each node only appears once in the search result.

6. A method according to claim 1, wherein the application further performs:
   modifying the search result to take account of connections between nodes that are present in the interconnected network but that are not present in any of the path trees.

7. A method according to claim 1, wherein at least one of the interconnected nodes is a witness node and the application further performs:
   identifying a stored witness node in the data structure;
   using the stored witness node to determine separations between the witness node and at least two identified landmark nodes; and
   providing a search result related to the separation between said witness node and the at least two identified landmark nodes.

8. A method according to claim 1, wherein the path trees each of said plurality of nodes may appear in is limited to those path trees of the closest landmark nodes to said node.

9. A method according to claim 1, wherein the separation indication comprises both distances and paths between the landmark node and nodes in the path trees.

10. A method according to claim 1, wherein the separation indication is presented on a display of the computing device.

11. A computer device for processing a search query to determine a separation between a source node and a target node to provide a search result in a network of interconnected nodes comprising a landmark node, the computer device comprising:
  a first component comprising a data structure in which the landmark node has stored therewith a shortest path tree that indicates a separation between the landmark node and each of a plurality of nodes, each of said plurality of nodes appearing in no more than a predetermined number of shortest path trees such that the plurality of nodes are limited to a number of shortest path trees in which it can be included; and
  a second component comprising a processor configured to execute an application for generating a search result using instructions stored on the computer device, the application performing the following steps responsive to execution by the processor:
    accessing the data structure;
    identifying the landmark node in the accessed data structure having at least one of the source node and the target node in their shortest path trees; and
    determining a search result related to the shortest path tree of the identified landmark node.

12. A computing device as recited in claim 11, wherein the data structure has stored, for each landmark node, an indication of a separation to at least one other landmark node.

13. A system comprising:
  a processor; and
  one or more computer-readable storage media storing instructions that, responsive to execution by the processor, cause the system to perform operations comprising:
    receiving a search query in the form of a digital message, the query identifying a source node and a target node in a network of interconnected nodes, at least one of the interconnected nodes being a landmark node;
    accessing a data structure in which the landmark node has stored therewith a path tree that indicates a separation between the landmark node and each of a plurality of nodes, each of said plurality of nodes being limited to appearing in no more than a predetermined number of path trees;
    identifying the landmark node in the accessed data structure having at least one of the source node and the target node in their path tree; and
    determining a search result related to the path tree of the identified landmark node.

14. A system as recited in claim 13, wherein the data structure has stored, for each landmark node, an indication of a separation to at least one other landmark node.

15. A system as recited in claim 13, wherein the determining the search result is related to two landmark nodes and uses an indication of a separation between said two landmark nodes.

16. A system as recited in claim 13, the operations further comprising detecting whether any nodes appear at least twice in the search result; and, if so detected, modifying the search result such that each node only appears once in the search result.

17. A system as recited in claim 13, the operations further comprising modifying the search result to take account of connections between nodes that are present in the interconnected network but that are not present in any of the path trees.

18. A system as recited in claim 13, wherein at least one of the interconnected nodes is a witness node and the operations further comprising:
  identifying a stored witness node in the data structure;
  using the stored witness node to determine separations between the witness node and at least two identified landmark nodes; and
  providing a search result related to the separation between said witness node and the at least two identified landmark nodes.

19. A system as recited in claim 13, wherein the path trees each of said plurality of nodes may appear in is limited to those path trees of the closest landmark nodes to said node.

20. A system as recited in claim 13, wherein the separation indication comprises both distances and paths between the landmark node and nodes in the path trees.

* * * * *